Feb. 4, 1947.   R. H. HORTON ET AL   2,415,388
VEHICLE AND BRAKE MECHANISM THEREFOR
Original Filed June 21, 1941   2 Sheets-Sheet 1
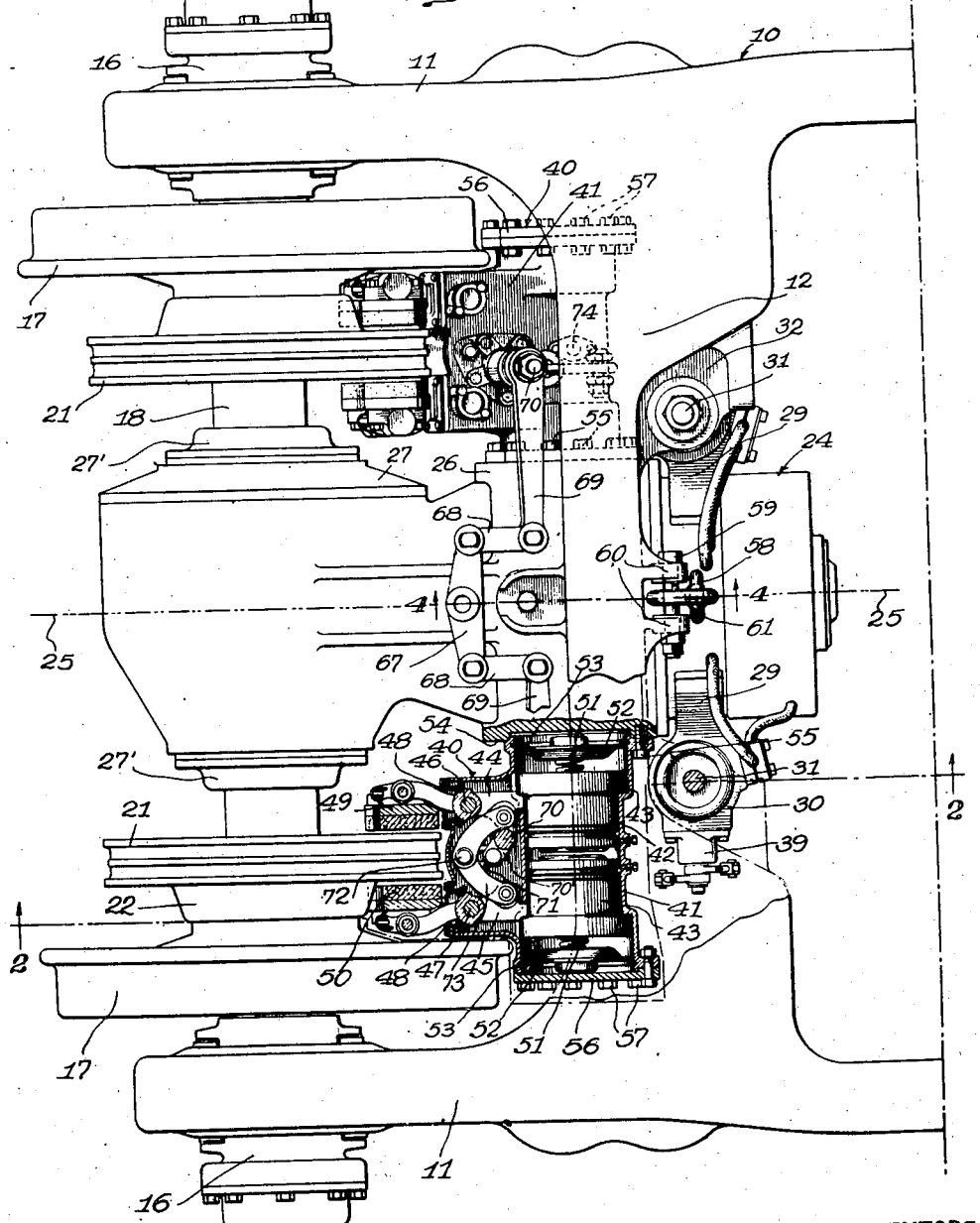
INVENTORS
Reuben H. Horton,
Carolus L. Eksergian and
Henry K. Harwich
BY
ATTORNEY

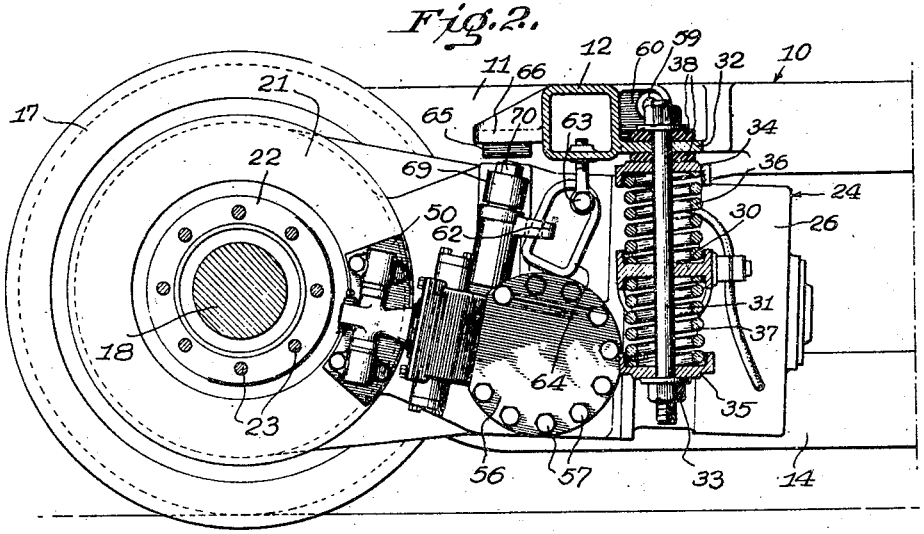
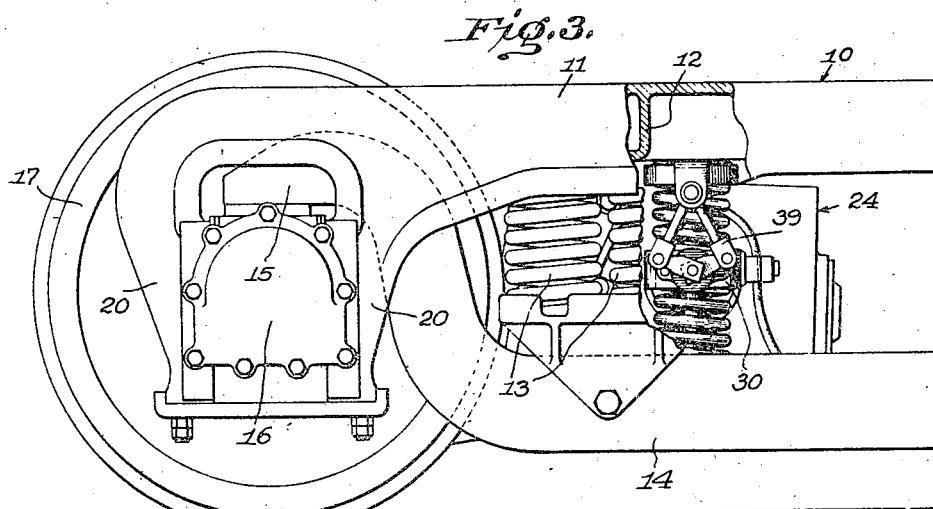
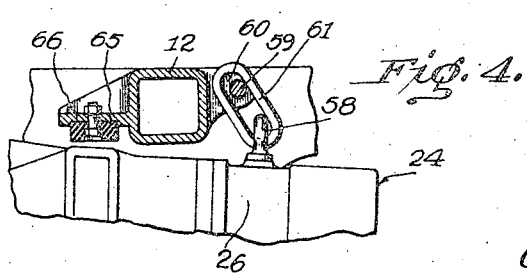

Patented Feb. 4, 1947

2,415,388

UNITED STATES PATENT OFFICE 2,415,388

VEHICLE AND BRAKE MECHANISM THEREFOR

Reuben H. Horton, Philadelphia, Pa., and Carolus L. Eksergian, Detroit, Mich., and Henry K. Harwick, Darby, Pa., assignors to The Budd Company, Philadelphia, Pa., a corporation of Pennsylvania Continuation of application Serial No. 399,060, June 21, 1941. This application November 9, 1943, Serial No. 509,608

18 Claims. (Cl. 188—153)

The invention relates to vehicles and brake mechanism therefor, and more particularly, to motor-driven trucks and associated brake mechanism, such as disclosed in copending application Serial No. 399,060, filed June 21, 1941, and now abandoned, of which this application is a continuation.

It is an object of the invention to simplify the construction of vehicles of this class by utilizing a longitudinally extending brake support, such as the driving motor casing to support elements of the brake structure. This object is attained, in part, by arranging the brake support, such as the motor casing and the gear casing forming an extension thereof, with its longitudinal axis at substantially right angles to the axle and supporting it generally centrally of the axle through laterally spaced bearings and at a remote point of the truck frame. This arrangement leaves space at each side of the support or motor casing between it and the side frames of the truck, and according to the invention such space is utilized to receive parts of the brake mechanism supported from the support or motor casing. With this arrangement of support or motor casing with respect to the truck frame and axle, it is possible to directly removably secure to the sides of the support or motor casing, brake cylinder units in which most of the parts are carried in a sealed housing or casing, such units being similar to the units shown, described and claimed in copending application of C. L. Eksergian, Serial No. 399,779, filed June 26, 1941.

Other and further objects and advantages and the manner in which they are attained will become apparent from the following detailed description when read in connection with the drawings forming a part hereof.

In the drawings:

Fig. 1 is a plan view of one end of a truck having the invention applied thereto, parts being shown in section;

Fig. 2 is a vertical longitudinal sectional view, the section being taken approximately on the line 2—2 of Fig. 1;

Fig. 3 is a side elevational view, parts being broken away; and

Fig. 4 is a fragmentary detail sectional view taken approximately on the line 4—4 of Fig. 1.

In the drawings, the truck to which the invention is shown applied comprises a frame designated generally by 10, including the side frames 11 and transoms, as 12, interconnecting them. The truck frame may be spring-supported by springs, as 13, from the equalizer bars, as 14. The latter have their ends offset vertically upwardly at 15 and rest through these offset ends 15 on top of the axle boxes 16. The latter form parts of a wheel and axle assembly including the wheels 17 and axle 18, the latter suitably journalled at its ends in the journal boxes. The side frames 11 are formed at their ends with the usual spaced pedestals, as 20, receiving and guiding the adjacent axle box for relative vertical movement.

Associated with each wheel of the wheel and axle assembly is a rotary disc braking member 21 having radial braking faces and secured to rotate with its associated wheel through a mounting member 22 secured by bolts, as indicated at 23, Fig. 2, to the hub of the wheel. The rotary disc braking members are laterally spaced from the adjacent wheels to receive parts of the nonrotary braking means between them and the adjacent wheels.

The motor assembly 24 is arranged with its longitudinal axis, as 25, extending at right angles to the axle 18 and is preferably housed in a strong motor casing, as 26, which may be an extension of and rigidly secured to the gear casing 27 surrounding and rotatably supported centrally of the axle between the rotary brake members 21 by spaced bearings indicated at 27'. It will be understood that the electric motor drives the axle through appropriate gearing, not shown, within the gear casing 27.

The combined motor and gear casing so supported with its longitudinal axis at right angles to the axle leaves lateral spaces between it and the side frames free for the reception of brake mechanism for cooperation with the respective rotary disc brake members 21. Since the motor casing 26 is further supported from the transom of the truck frame, it provides a convenient support for the said brake mechanism.

As shown in the drawings, the motor casing extends inwardly beneath the transom 12 and is resiliently suspended therefrom. Such resilient suspension may comprise brackets 29 rigidly secured to the opposite sides of the motor casing and each having horizontal cupped seat portions 30 which are centrally perforated to receive a supporting bolt 31 therethrough. Each such bolt passes through a hole in a ledge 32 strongly braced to the body of the transom and has its head resting on top of this ledge. The lower end of this bolt is provided with a nut 33, and spring-seating upper and lower perforated cups 34 and 35 are slipped onto the bolt. Between the horizontal cupped seat portion of each bracket 29 and the associated upper and lower cups 34 and 35, respectively, are arranged the coil springs 36 and 37, which act to cushion the weight of the motor in passing over track irregularities. Sound-deadening means, such as rubber washers, as 38, may be arranged between the heads of the supporting bolts 31 and the ledge 32, and between said ledge and the upper cup 34.

Additionally, shock-absorbing means, such as is indicated at 39, Fig. 3, may be arranged between the transom 12 and each of the brackets 29, 30 from the motor casing.

The motor casing, so suspended between the axle and frame, provides an admirable means for supporting brake mechanism for cooperating with the rotary disc members 21. It will be understood, however, that other support structures, similarly suspended, would serve equally well to removably support the brake mechanism now to be described.

Such brake mechanism may comprise a pair of brake cylinder units, designated generally by reference numeral 40, each unit including a sealed housing or casing, as 41, of generally T-form, see Fig. 1, the head of the T being provided with a stepped cylinder bore 42 guiding the pistons 43 which actuate the levers 44, 45 pivoted in the casing at 46, 47 and projecting through sealed openings, as 48 permitting the necessary movement thereof, and carrying at their outer ends the brake shoes 49, 50 in position to coact with the opposed faces of the associated rotary disc member 21. Springs, as 51, return the pistons and levers to the release position, said springs acting, respectively, on the levers and pistons, on the one hand, and on a removable associated abutment 52 held in place in the cylinder bore by a split ring 53. The construction of these cylinder units and their operation are similar to that disclosed in the copending application Serial No. 399,779 above referred to.

To secure the cylinder units to the motor casing, the sides of the motor casing are provided with machined seats, as 54, against which the inner ends of the cylinder units fit and to which they are strongly secured by an annular series of bolts 55. The outer ends of the cylinder units may be fitted with end closures 56 secured thereto by the annular series of bolts, as 57.

Thus it will be seen that the brake cylinder housing units can be readily assembled or disassembled from the main brake support structure or motor casing, itself flexibly suspended from the wheel and axle assembly and the truck frame as already described, without affecting the suspension of the main support structure or motor casing. When the brake cylinder housing units are secured in place, they extend cantilever-wise from the main support or motor casing, into the space normally free to receive them between said main support structure and the side members of the truck frame.

As a safety feature, means are provided for preventing the dropping of the motor casing to the tracks upon failure of the resilient support therefor from the transom. As shown in Figs. 1 and 4, such means may comprise an eye bolt 58 secured to the top of the motor casing, and a bolt 59 extending through spaced lugs 60 projecting from the transom, this eye and bolt being loosely interconnected by a link 61, which is of a length to come into play only in the event of failure of the usual resilient support.

This safety means may be supplemented, as shown in Figs. 1 and 2, by similar means arranged between each of the cylinder units and the transom, and comprising an eye 62 on the cylinder unit, a transverse bolt 63 supported from the transom 12 and a loose link 64 interconnecting the eye and bolt.

To prevent metal-to-metal contact between motor casing and transom, upon vertical oscillation of the casing, a rubber buffer, as 65, may be secured to a bracket 66 projecting from the transom and in position to be engaged by the casing in such oscillation.

Of course, the brake cylinder units may be provided, in addition to the fluid-actuating means in which the fluid is admitted between the pistons through a port, as 74, Fig. 1, with manual actuating means including the equalizer bar 67, the links 68 connected to its opposite ends and to the respective arms 69 extending inwardly from the opposite cylinder units. Each of the arms, in turn, is connected to turn the shaft, as 70, connected by crank arm 70' and a link, as 71, to the center pin 72 of the toggle linkage 73 interconnecting the levers 44, 45. This manual actuation again is entirely similar in construction and operation to that shown in the copending application above referred to.

While a specific embodiment of the invention has been shown and described, it will be understood that changes and modifications may be made without departing from the spirit and scope of the invention as expressed in the claims appended hereto.

What is claimed is:

1. In a motor truck, in combination, a wheel and axle assembly, a truck frame supported thereby and having a transverse member longitudinally remote from the axle of said assembly, a rotary brake element secured to rotate with each wheel of said wheel and axle assembly, a driving motor for the axle having a casing supported from said axle between the rotary brake elements associated with the opposite wheels and from said transverse member of the frame, and brake cylinder units each including a non-rotary brake member for cooperation with the associated rotary brake member and a brake cylinder for actuating said non-rotary member into braking engagement with the associated rotary brake member, said units being disposed on opposite sides of the motor casing.

2. In a motor truck, in combination, a wheel and axle assembly, a truck frame having longitudinal side members supported adjacent the ends of said assembly and a transverse member interconnecting the side members, a wheel and a rotary brake element secured thereto adjacent each of the ends of said wheel and axle assembly but inside the longitudinal side members, a motor having its axis extending at right angles to the axle of said assembly and having a casing housing it and a driving gearing to said axle supported thereon intermediate the opposed wheel and brake elements, and on said transverse member of the frame, and brake units each including a non-rotary brake element in cooperative relation with one of said rotary brake elements and actuating means therefor, said units being disposed so as to extend from the opposite sides of the motor casing and supported thereby in the region longitudinally between the spaced points of support of the casing.

3. In a motor truck, in combination, a wheel and axle assembly, a truck frame supported adjacent the opposite ends of said assembly, a rotary brake element associated with each wheel of said assembly, a motor and gear casing supported on the axle of said assembly between the opposed wheel and associated brake elements and in a region remote from said axle, and brake cylinder units each including a brake cylinder, a non-rotary brake element for cooperation with an associated rotary brake element and a lever actuable by said cylinder and carrying said non-rotatable brake element, said units being disposed on opposite sides of said motor and gear casing and supported therefrom longitudinally between the points of support of said casing.

4. In a motor truck, in combination, a wheel and axle assembly, a truck frame having side members supported adjacent the opposite ends of said assembly, a motor and gear casing having its longitudinal axis extending at right angles to the axle of said assembly and supported thereby between the wheels of said assembly and at a remote region, whereby space is provided between the motor and gear casing and the side members of the frame available for the disposition of brake mechanism, and means supporting parts of said mechanism from the casing in said space and longitudinally between the points of support of said casing.

5. In a motor truck, in combination, a wheel and axle assembly, a truck frame having side members supported adjacent the opposite ends of said assembly, a transom interconnecting said side members, a motor and gear casing supported on the axle of said assembly at one end thereof, with its longitudinal axis arranged at right angles to said axle and extending under the transom at its opposite end, and means for resiliently supporting said motor casing from the transom, a rotary brake member associated with each wheel of said wheel and axle assembly, and a non-rotary brake member together with actuating means therefor carried at each of the opposite sides of said motor casing longitudinally between the points of support of said casing and in cooperative relation to the respective rotary brake members.

6. In a motor truck, in combination, a frame having side members, a wheel and axle assembly for supporting said frame, a motor and gear casing spaced from the side members of the frame and arranged with its longitudinal axis at right angles to the axle of said assembly and supported thereby at one end and at its opposite end from the truck frame, the opposite sides of said casing longitudinally between the points of support thereof being constructed and arranged to provide securing seatings, and brake mechanism units, each comprising a brake member and actuating means therefor, removably secured to the respective seatings and projecting laterally into the space between the casing and the adjacent side frame member.

7. In a motor truck, a wheel and axle assembly, a frame supported thereby, a motor and gear casing arranged with its longitudinal axis at right angles to the axle of said assembly and supported thereby at one end and by the frame at its other end, a rotary brake member concentric with the axle of said assembly and rotatable with a wheel of said assembly, and a brake mechanism unit including a non-rotatable brake member for cooperation with said rotary member and actuating means therefor, said unit being carried by said casing longitudinally between the points of support of said casing.

8. In a motor truck, in combination, a frame including side members, a wheel and axle assembly supporting said side members, a motor casing having its longitudinal axis extending at right angles to the axle of said assembly and supported centrally thereon at one end and on the frame adjacent its opposite end, thereby leaving space between the sides of said casing and the side members of the frame to receive brake mechanism units, and means on the casing longitudinally between its points of support for securing said units.

9. In a motor truck, in combination, a wheel and axle assembly, a motor drive assembly therefor including a casing for housing the motor and drive and arranged with its longitudinal axis at right angles to the axle of said assembly and supported thereby at one end and by the truck at its other end remote from said axle, and brake mechanism units supported by and extending laterally from said casing intermediate its points of support.

10. In a motor truck, a wheel and axle assembly, a rotary brake member mounted in concentric relation with the axle of said assembly and associated in driven relation one with each wheel of said assembly, and an elongated motor casing having its longitudinal axis extending at right angles to the axle of said assembly and supported at one end on said axle and at its other end at a point longitudinally remote therefrom, said casing supporting, on each of the opposite sides thereof and longitudinally intermediate its points of support, a non-rotary brake member and actuating means therefor in association with the adjacent rotary brake member.

11. In a motor truck, in combination, a frame, a wheel and axle assembly supporting said frame, a motor casing having its longitudinal axis extending at right angles to the axle of said assembly and supported thereon adjacent one end thereof and on the frame adjacent the other end thereof, a rotary disc brake member secured to rotate with each wheel of said wheel and axle assembly, and brake cylinder units, one rigidly secured to each side of said motor casing, each of said units comprising a casing having a cylinder bore, a pair of pistons movable in said bore, a pair of levers carried by said unit casing for actuation by said pistons, respectively, a pair of brake shoes carried by said levers in cooperative relation with the adjacent rotary disc brake member, means for admitting fluid pressure between the pistons to apply the brakes and means for returning the pistons and brake shoes to inoperative position.

12. In a motor truck, in combination, a frame, a wheel and axle assembly supporting said frame, a rotary brake member associated with each wheel of said assembly, and a motor casing having its longitudinal axis extending at right angles to the axle of said assembly and supported thereon and on the frame in a region remote from said axle, said motor casing carrying on the opposite sides thereof brake cylinder units, each including brake shoes for cooperation with the adjacent rotary brake member and actuating means for said shoes, the support from the frame comprising a normally operative supporting means and safety means operative to effect the support upon failure of the normally operative means.

13. In a motor truck, in combination, a wheel and axle assembly, a truck frame supported thereby adjacent the opposite ends of said assembly, rotary brake discs secured, respectively, to the wheels of said wheel and axle assembly, a driving motor arranged with its axis at right angles to the axle of said assembly and supported on said axle between the brake discs and on the frame in a region remote from said axle, and brake units each comprising brake shoes adapted to cooperate with the respective discs, brake levers carrying the shoes and actuating means for said levers, said units being supported to project laterally from the opposite sides of the motor in a region longitudinally intermediate the spaced points of support therefor.

14. In a motor truck, in combination, a frame, a wheel and axle assembly supporting said frame, a motor casing having its longitudinal axis extending at right angles to the axle of said assembly and supported thereon adjacent one end thereof and on the frame adjacent the other end thereof, a rotary braking face rotatable with each wheel of said wheel and axle assembly, and brake cylinder units, one rigidly secured to each side of the motor casing, each of said units comprising a casing having a cylinder bore therein, a piston movable in said bore, a brake shoe in cooperative relation with the adjacent rotary braking face and means for operatively connecting said piston and shoe, means for admitting fluid pressure to one face of said piston to move its associated shoe into braking engagement with its cooperative rotary braking face and means for returning the piston and shoe to inoperative position.

15. In a vehicle brake arrangement, a vehicle frame, a supporting wheel and axle assembly, brake discs mounted thereon, one adjacent each wheel of said assembly, brake shoes adapted for engagement with the opposite sides of each disc, and a support for said shoes suspended between the wheel and axle assembly and a remote portion of the vehicle frame, seat portions at the opposite sides of said support, and cylinder housings extending laterally cantilever-like from the respective seat portions and removably seated thereon, means securing said housings in position upon respective seat portions, and brake levers pivoted in each housing and operatively connected to the associated shoes.

16. In a railway truck, in combination, a frame, a wheel and axle assembly supporting said frame, a brake support having its longitudinal axis extending at right angles to the axle of said assembly and supported thereon adjacent its one end and on the frame adjacent its other end, a rotary braking face rotatable with each wheel of said wheel and axle assembly, and brake cylinder units, one rigidly but removably secured to each side of said support, each of said units comprising a casing having a cylinder bore therein, a piston movable in said bore, a brake shoe in cooperative relation with the adjacent rotary braking face and a brake lever pivoted in the casing and operatively connecting said piston and shoe, and each of said units being removable without disrupting the support.

17. A brake mechanism for a vehicle comprising a wheel and axle assembly, brake discs mounted thereon, brake shoes adapted for engagement with the opposite sides of each disc, and support means for said shoes comprising a brake supporting member supported at laterally spaced points on the vehicle, seat portions on laterally spaced parts of said brake supporting member, and cylinder housings removably mounted on respective seat portions and removable therefrom without disrupting the continuity of said supporting member between its laterally spaced points of support, means securing said housings in position upon respective seat portions, and brake levers fulcrumed in each housing and operatively connected to the associated shoes.

18. A brake mechanism for a vehicle comprising a wheel and axle assembly, laterally spaced rotary brake members mounted thereon, a non-rotary brake element adapted for engagement with each of said rotary members, support means for said non-rotary elements comprising a brake supporting member supported at laterally spaced points on the vehicle, seat portions on laterally spaced parts of said brake supporting member and cylinder housings removably mounted on the respective seat portions and removable therefrom without disrupting the continuity of said supporting member between its laterally spaced points of support, means securing said housings in position upon the respective seat portions, and a brake lever fulcrumed on each housing and operatively connected to the associated non-rotary element.

REUBEN H. HORTON.
CAROLUS L. EKSERGIAN.
HENRY K. HARWICK.

REFERENCES CITED

The following references are of record in the file of this patent:

UNITED STATES PATENTS

| Number | Name | Date |
| --- | --- | --- |
| 2,228,818 | Eksergian | Jan. 14, 1941 |
| 2,239,086 | Eksergian | Apr. 22, 1941 |
| 2,251,668 | Eksergian | Aug. 5, 1941 |